United States Patent [19]

Sugisawa

[11] Patent Number: 5,719,742

[45] Date of Patent: Feb. 17, 1998

[54] METALLIZED PLASTIC FILM CAPACITOR

[75] Inventor: Kunio Sugisawa, Kanagawa, Japan

[73] Assignee: Nippon Petrochemicals Co., Ltd., Tokyo, Japan

[21] Appl. No.: 746,998

[22] Filed: Nov. 19, 1996

[30] Foreign Application Priority Data

Nov. 29, 1995 [JP] Japan ................................. 7-332480

[51] Int. Cl.$^6$ .............................. H01G 4/08; H01G 4/22; H01B 3/48
[52] U.S. Cl. ........................ 361/323; 361/315; 361/314; 252/567
[58] Field of Search .................................. 361/323, 315, 361/327, 314, 321.3; 29/25.42; 585/24–26, 6.3; 252/567, 570; 174/17 F, 25 C

[56] References Cited

U.S. PATENT DOCUMENTS

| | | | |
|---|---|---|---|
| 4,591,948 | 5/1986 | Sato et al. | 361/315 |
| 4,639,833 | 1/1987 | Sato et al. | 361/315 |
| 4,656,558 | 4/1987 | Bently | 361/327 |
| 5,107,395 | 4/1992 | Kawakami et al. | 361/315 |
| 5,384,684 | 1/1995 | Sugisawa et al. | 361/323 |

*Primary Examiner*—Michael W. Phillips
*Assistant Examiner*—Anthony Dinkins
*Attorney, Agent, or Firm*—Fisher, Christen & Sabol

[57] ABSTRACT

A metallized plastic film capacitor is here disclosed which is impregnated with an electrically insulating oil composition comprising 10 to 95% by weight of an aromatic hydrocarbon having at least 3 benzene rings and 90 to 5% by weight of an olefin oligomer containing 7% by weight or less of a fraction having a molecular weight of 500 or less and 2% by weight or less of a fraction having a molecular weight of 400 or less.

4 Claims, No Drawings

METALLIZED PLASTIC FILM CAPACITOR

BACKGROUND OF THE INVENTION

1. Field of the Invention

This invention relates to a metallized plastic film capacitor obtained by winding a metal-deposited film comprising a plastic film and a metal-deposited layer as an electrode which is formed on the plastic film by vacuum deposition. More specifically, this invention relates to a novel oil-impregnated metallized plastic film capacitor which is characterized by being impregnated with a novel electrically insulating oil composition.

2. Prior Art

A metallized plastic film capacitor (hereinafter referred to as "an MF capacitor"), which can be obtained by winding a metal-deposited film comprising a plastic film and a metal-deposited layer as an electrode formed on the plastic film by vacuum-depositing a metal such as aluminum, has been widely used for reasons why it has a self healing action and its voltage resistance can be heightened to permit its miniaturization.

Heretofore, also for the MF capacitor, the impregnation with an electrically insulating oil has been carried out.

A polybutene having a relatively low molecular weight has been conventionally used as an impregnating oil for the MF capacitor. On an edge surface of the MF capacitor, a metal deposition, i.e., the so-called metallikon treatment has been made in order to lead out a lead wire from a metal layer as an electrode. The formation of the metal layer has been done for the attachment of the lead wire, and hence all the edge surfaces are not treated. Therefore, the element can be impregnated with the impregnating oil through the untreated edge surfaces of the element. The capacitor subjected to such a metallikon treatment suffers stress, so that there is observed a phenomenon that corona (partial) discharge occurs particularly on an edge surface portion at the time of the application of voltage. However, the conventional impregnation with the polybutene can not always sufficiently prevent the discharge on the edge surface portion, with the result that the corona discharge start voltage of the MF capacitor is low and a breakdown time is also short.

In addition, for example, in U.S. Pat. No. 4,656,558, Japanese Patent Appln. Publication Gazette No. 32526/1992 and the like, an MF capacitor impregnated with a polybutene having a high molecular weight has been suggested. However, the viscosity of the polybutene having the high molecular weight described in these publications is unavoidably too high to make the usual impregnation operation of the impregnating oil difficult. Thus, the suggested techniques are not always satisfactory.

Moreover, Japanese Patent Application Laid-open Gazette No. 45510/1986 and U.S. Pat. No. 5,384,684 and the like have a drawback that when aromatic hydrocarbons having 3 benzene rings suggested by these inventions are used singly, the breakdown time of the obtained MF capacitor is short, as shown particularly in U.S. Pat. No. 5,384,684.

A metallized plastic film capacitor in which a mixture of an olefin oligomer and an aromatic hydrocarbon having 3 benzene rings is used is not known yet.

SUMMARY OF THE INVENTION

In view of the above-mentioned circumstances, this invention has been intended, and an object of this invention is to provide a practically useful impregnation type MF capacitor. More specifically, the object of this invention is to provide a practically useful impregnation type MF capacitor having a high corona discharge voltage and a long breakdown time.

That is to say, the first aspect of this invention is directed to an MF capacitor which is impregnated with an electrically insulating oil composition comprising 10 to 95% by weight of an aromatic hydrocarbon having at least 3 benzene rings and 90 to 5% by weight of an olefin oligomer containing 7% by weight or less of a fraction having a molecular weight of 500 or less and 2% by weight or less of a fraction having a molecular weight of 400 or less.

The second aspect of this invention is directed to an electrically insulating oil composition for an MF capacitor which comprises 10 to 95% by weight of an aromatic hydrocarbon having at least 3 benzene rings and 90 to 5% by weight of an olefin oligomer containing 7% by weight or less of a fraction having a molecular weight of 500 or less and 2% by weight or less of a fraction having a molecular weight of 400 or less.

The third aspect of this invention is directed to an MF capacitor or an electrically insulating oil composition for the MF capacitor regarding the first or the second aspect of this invention in which the aromatic hydrocarbon having at least 3 benzene rings is an aromatic hydrocarbon represented by the following formula:

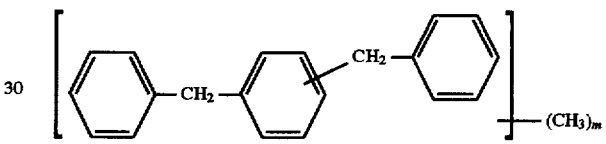

wherein m is an integer of 0 to 3.

DETAILED DESCRIPTION OF THE INVENTION

This invention will be described in more detail.

An MF capacitor of this invention can be obtained by vacuum-depositing, in a usual manner, a metal such as zinc or aluminum on one surface or both the surfaces of a plastic film of a polyester such as PET or a polyolefin such as polypropylene, particularly preferably a polyolefin film of polypropylene or the like as a base film to form a metal-deposited plastic film, winding this metal-deposited plastic film in a usual manner to obtain a capacitor element, and then impregnating the capacitor element with an insulating oil.

The base film is preferably a biaxially oriented film, and further preferably, it is an easily impregnable type film having a coarsened surface. In the case of the plastic film on both the surfaces of which the metal is deposited or the plastic film on one surface of which the metal is deposited, another plastic film (an undeposited film) can be superposed on the metal-deposited plastic film as needed, and they can be then wound.

In this invention, the impregnation is carried out with an electrically insulating oil comprising an olefin oligomer and an aromatic hydrocarbon having at least 3 benzene rings.

The olefin oligomer used is an oligomer of a lower olefin such as propylene, n-butene or isobutene. This olefin oligomer may be copolymerized with another olefin, for example, ethylene. A preferable example is polybutene which is a copolymer obtainable by olymerizing a $C_4$ fraction containing n-butene and isobutene in the presence of a Friedel-Crafts catalyst comprising aluminum chloride, boron fluoride or the like.

Each of these oligomers can usually be manufactured by cationic polymerization, and so it has a constant molecular weight distribution. That is to say, even if having a constant number-average molecular weight, a usual commercially available oligomer often contains components having much lower molecular weight than the number-average molecular weight (refer to the FIG. 1 of U.S. Pat. No. 4,656,558). In this connection, the molecular weight distribution can be measured by classifying the oligomer into some fractions having different number-average molecular weight by GPC (gel permeation chromatography) using a suitable control substance such as a monodisperse polystyrene.

In the oil-impregnated capacitor of this invention in which the aromatic hydrocarbon is used together, the presence of the olefin oligomer having a molecular weight of 500 or less, particularly a molecular weight of 400 or less easily leads to the drop of corona discharge start voltage, the shortening of breakdown time and the like. However, needless to say, it is difficult to manufacture the oligomer containing an extremely small amount of the low-molecular weight fraction, and it is not industrially easy to strictly remove a fraction having a specific molecular weight from the oligomer containing a certain amount of the low-molecular weight fraction.

However, with regard to the oil-impregnated capacitor of this invention in which the aromatic hydrocarbon is used together, it has been elucidated that the above-mentioned inconveniences can be eliminated by using the oligomer in which the content ratio of the fraction having a molecular weight of 500 or less is 7% by weight or less, preferably 5% by weight or less (with respect to 100% by weight of the olefin oligomer) and the content ratio of the fraction having a molecular weight of 400 or less is 2% by weight or less (with respect to 100% by weight of the olefin oligomer). Such an oligomer, for example, polybutene of a commercially available product can be suitably manufactured by a known method such as multi-stage thin film distillation. If the commercially available product has above-mentioned content ratio of the fraction, such a commercially available product can be used as an olefin oligomer. Incidentally, the respective fractions having different molecular weight can be separated by the above-mentioned GPC, whereby the content ratios of the fraction having a molecular weight of 500 or less and the fraction having a molecular weight of 400 or less can be confirmed.

The number-average molecular weight of the olefin oligomer which can be used in this invention is preferably 3000 or less. If the number-average molecular weight is within this range, the viscosity of the oligomer is desirable, so that the impregnation operation of the capacitor with the oligomer is easy. In addition, the compatibility of such an oligomer with the aromatic hydrocarbon which is the other component to be mixed is also good, which is preferable in this invention. In this connection, the number-average molecular weight can be measured by, for example, a method using the above-mentioned GPC.

The above-mentioned olefin oligomer, for example, polybutene is used in an amount of 5 to 90% by weight, preferably 10 to 80% by weight with respect to 100% by weight of the electrically insulating oil with which the capacitor is to be impregnated. If the amount of the olefin oligomer to be blended is within this range, the effect of the added olefin oligomer can be sufficiently exerted, and the effect of inhibiting the corona discharge (the partial discharge) can also preferably be shown.

The aromatic hydrocarbon which is to be mixed with the olefin oligomer in this invention is an aromatic hydrocarbon having at least 3 benzene rings, preferably 3 benzene rings. This kind of aromatic hydrocarbon is more excellent in film swell characteristics as compared with an aromatic hydrocarbon having 2 benzene rings. In addition, when the aromatic hydrocarbon is mixed with the above-mentioned olefin oligomer, the durable capacitor can be obtained.

Typical examples of the aromatic hydrocarbon having 3 benzene rings are triarylalkanes, diaralkylaryls, triaryls, aralkyldiaryls, arylnaphthalenes and aralkylnaphthalenes. The benzene ring may be condensed or non-condensed. They may be used in the form of a mixture of two or more thereof. The molecular weight of the aromatic hydrocarbon is 500 or less, preferably 400 or less, which permits the supply of the desirable viscosity.

The aromatic hydrocarbons which are more preferable owing to the low viscosity are aromatic hydrocarbons represented by the following formula:

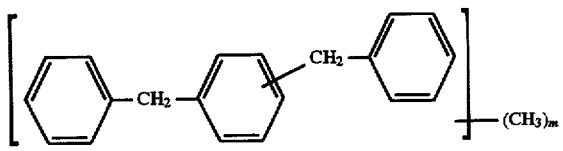

The aromatic hydrocarbons represented by the above-mentioned formula include compounds in which the benzene rings are substituted by 1 to 3 methyl groups, and compounds in which a hydrogen atom is omitted from a methylene group which is a coupling group between the benzene rings and the methylene group is substituted by a methyl group instead. However, the preferable methyl group-substituted aromatic hydrocarbons are aromatic hydrocarbons in which the benzene ring is substituted by 1 to 3 methyl groups. The aromatic hydrocarbons represented by the above-mentioned formula can be used singly or in the form of a mixture of two or more thereof.

Examples of the aromatic hydrocarbons represented by the above-mentioned formula are dibenzylbenzene, dibenzyltoluene, dibenzylxylene and these compounds substituted by the methyl group. Furthermore, various kinds of position isomers in which the position of the methyl group is different are present. In this invention, any position isomer can be used, but the isomer which maintains a liquid state preferably at ordinary temperature, more preferably at −30° C. is used. A suitable example of the aromatic hydrocarbon which is liquid at −30° C. and which has the desirable viscosity is an aromatic hydrocarbon mixture comprising 10 to 85% by weight of a dibenzylbenzene in which m of the above-mentioned formula is 0, 5 to 90% by weight of a monomethyl-substituted compound in which m of the above-mentioned formula is 1, and 5 to 80% by weight (100% by weight in total) of a dimethyl-substituted compound in which m of the above-mentioned formula is 2.

The amount of the aromatic hydrocarbon having 3 benzene rings, for example, dibenzylbenzene, dibenzylxylene or dibenzyltoluene is in the range of 95 to 10% by weight, preferably 90 to 20% by weight with respect to 100% by weight of the electrically insulating oil with which the impregnation is done. If the amount of the aromatic hydrocarbon is within this range, there are obtained an effect that the breakdown time of the obtained capacitor can be prolonged, and another effect that its corona discharge start voltage can be sufficiently heightened.

A capacitor element prepared by winding the above-mentioned metallized plastic film can be impregnated in a usual manner with the electrically insulating oil comprising the olefin oligomer and the aromatic hydrocarbon having at least 3 benzene rings, thereby obtaining the capacitor of this invention. Examples of the metal to be vacuum-deposited are metals such as zinc and aluminum. Examples of the plastic film are a polyolefin such as polypropylene and a polyester such as PET. The preferable plastic film is a biaxially oriented plastic film. An easily impregnable type film having a surface to be vacuum-deposited which is coarsened by a suitable technique can also be used. The film, one surface or both the surfaces of which are metallized, is wound in a usual manner to form the capacitor element. In the case of the film in which both the surfaces are metallized, a plastic film can be suitably superposed on the metallized plastic film, and they can be then wound to form the capacitor. Also in the case of the metallized film in which one surface is vacuum-deposited, the plastic film can be suitably superposed on the metallized plastic film, and then used. Furthermore, on an edge surface of the element, a metal vacuum deposition, i.e., the so-called metallikon treatment is usually carried out in order to lead out a lead wire from the above-mentioned metal layer as the electrode. An electrically insulating oil composition of this invention may suitably comprise well-known additives, for example, stabilizers such as epoxy compounds and antioxidants.

DESCRIPTION OF THE PREFERRED EMBODIMENTS

This invention will be described in more detail with reference to the following examples, but the scope of this invention should not be limited to these examples at all.

EXAMPLE 1 AND COMPARATIVE EXAMPLES 1 TO 3

In the example and the comparative examples, there were used insulating oil compositions obtained by blending the following insulating oil samples in ratios shown in Table 1. Here, the number-average molecular weight of polybutene and the contents of fractions having a molecular weight of 500 or less and a molecular weight of 400 or less were measured in a usual manner using GPC.

[Insulating oil samples]

(1) PB-A: PB-A is a commercially available polybutene having a number-average molecular weight of 630. The content ratio of a fraction having a molecular weight of 500 or less is 15% by weight, and the content ratio of a fraction having a molecular weight of 400 or less is 5% by weight. Incidentally, this commercially available polybutene is polybutene for a typical electrically insulating oil grade.

(2) PB-B: PB-B is a polybutene having a number-average molecular weight of 750. This polybutene is obtainable by subjecting the commercially available polybutene (the above-mentioned PB-A) to multi-stage thin film distillation in a usual manner, and in the thus obtained polybutene, the content ratio of a fraction having a molecular weight of 500 or less is 3% by weight, and the content ratio of a fraction having a molecular weight of 400 or less is 0.5% by weight.

(3) AROMA: AROMA has a pour point of −35° C. and the viscosity of 12.2 cSt (40° C.), and it is an aromatic hydrocarbon mixture comprising 14% by weight of a dibenzylbenzene, 61% by weight of a monomethyl-substituted dibenzylbenzene, 22% by weight of a dimethyl-substituted dibenzylbenzene and 3% by weight of a trimethyl-substituted dibenzylbenzene (100% by weight in total).

[Measurement conditions of GPC]

Polystyrene gels (made by Toso Co., Ltd, trade names G2000H, G3000H, G4000H and G5000H).

Measurement temperature: 40° C., solvent: tetrahydrofuran, and detector: refractometer.

[Measurement of corona discharge (partial discharge) start voltage]

Zinc was vacuum-deposited on one surface of each of biaxially oriented polypropylene films in a usual manner to obtain metallized plastic films each having a margin of 5 mm and a width of 75 mm. Then, these films were wound to form capacitor elements. A part of the edges of these elements was subjected to a metallikon treatment by zinc vacuum deposition to attach a lead wire thereto.

The thus obtained capacitor elements were each impregnated at 60° C. in a usual manner with each of insulating oil compositions in mixing ratios shown in Table 1, thereby preparing MF capacitors having a capacity of 3 μF. Since each insulating oil composition had the low viscosity, the impregnation operation could easily be carried out.

Voltage was applied to each of the obtained capacitors at a temperature of 25° C., while the voltage was increased, to measure the corona discharge start voltage of the capacitors. The results are shown in Table 2.

[Measurement of breakdown voltage by application of constant voltage]

The metallikon-treated capacitor elements obtained above were similarly impregnated at 80° C. in a usual manner with each of insulating oil compositions in mixing ratios shown in Table 1, thereby preparing MF capacitors having a capacity of 3 μF. Also in this case, since each insulating oil composition had the low viscosity, the impregnation operation could easily be carried out.

A constant voltage (a potential gradient=130 V/μm) was applied to each of the obtained 5 capacitors to measure an average time until the capacitor broke at a temperature of 80° C. In this case, the two values of a maximum and a minimum were omitted, and from the remaining values, the average value was calculated. The results are shown in Table 2. In this table, the symbol X denotes that the capacitor broke, and the symbol O denotes that the capacitor did not break yet, after the lapse of each insulating breakdown time described in the table.

TABLE 1

| Comp. Ex. Example | Insulating Oil No. | Aromatic Hydrocarbon | | Olefin Oligomer | |
|---|---|---|---|---|---|
| | | Kind | Amount (wt %) | Kind | Amount (wt %) |
| Comp. Ex. 1 | Insulating Oil 1 | — | — | PB-A | 100 |
| Comp. Ex. 2 | Insulating Oil 2 | — | — | PB-B | 100 |
| Example 1 | Insulating Oil 3 | AROMA | 70 | PB-B | 30 |
| Comp. Ex. 3 | Insulating Oil 4 | AROMA | 100 | — | — |

TABLE 2

| Comp. Ex. Example | Corona Discharge Start Voltage (ratio)*1 | Insulating Breakdown Time (ratio)*1 | State of Breakdown |
|---|---|---|---|
| Comp. Ex. 1 | 1 | 1 | X |
| Comp. Ex. 2 | 1.52 | 5 | X |
| Example 1 | 4.84 | 98 | O |
| Comp. Ex. 3 | 5.42 | 15 | X |

*1: The insulating breakdown time and the corona discharge start voltage were denoted in a ratio on the basis of the assumption that a value of Comparative Example 1 (insulating oil 1: PB-A) was 1.

The results of Table 2 indicate that, in point of the corona discharge start voltage alone, the aforesaid aromatic hydrocarbon (Comparative Example 3) is excellent, but on the other hand, the cases of the olefin oligomer alone (Comparative Examples 1 and 2) are poor in this point.

Furthermore, it is apparent from the results of Table 2 that in the single use of the above-mentioned aromatic hydrocarbon or the olefin oligomer (Comparative Examples 1 to 3), the breakdown is reached in a shorter period of time, but the MF capacitor impregnated with the insulating oil compositions of this invention in which the aromatic hydrocarbon and the olefin oligomer are mixed possesses excellent electrical properties such as the prolonged breakdown time and the sufficiently heightened corona discharge start voltage.

The MF capacitor of this invention is an oil-impregnated capacitor which is remarkably excellent in voltage resistance and durability. Furthermore, for the MF capacitor in which a metal thin film of a metal-deposited film as an electrode is thin and damage is small at the time of discharge, if the content ratio of the aromatic hydrocarbon is increased (i.e., if the content ratio of the olefin oligomer is decreased), the discharge can be effectively suppressed. On the contrary, for the MF capacitor in which the metal thin film of the metal-deposited film as the electrode is thick and the damage is large at the time of the discharge, if the content ratio of the olefin oligomer is increased (i.e., if the content ratio of the aromatic hydrocarbon is decreased), the damage can be inhibited by releasing the discharge little by little, in other words, by the discharge of the capacitor.

What is claimed is:

1. A metallized plastic film capacitor which is impregnated with an electrically insulating oil composition comprising 10 to 95% by weight of an aromatic hydrocarbon having at least 3 benzene rings and 90 to 5% by weight of an olefin oligomer containing 7% by weight or less of a fraction having a molecular weight of 500 or less and 2% by weight or less of a fraction having a molecular weight of 400 or less.

2. An electrically insulating oil composition for a metallized plastic film capacitor which comprises 10 to 95% by weight of an aromatic hydrocarbon having at least 3 benzene rings and 90 to 5% by weight of an olefin oligomer containing 7% by weight or less of a fraction having a molecular weight of 500 or less and 2% by weight or less of a fraction having a molecular weight of 400 or less.

3. A metallized plastic film capacitor according to claim 1 wherein the aromatic hydrocarbon having at least 3 benzene rings is an aromatic hydrocarbon represented by the following formula:

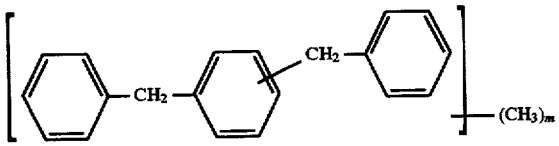

wherein m is an integer of 0 to 3.

4. An electrically insulating oil composition for a metallized plastic film capacitor according to claim 2 wherein the aromatic hydrocarbon having at least 3 benzene rings is an aromatic hydrocarbon represented by the following formula:

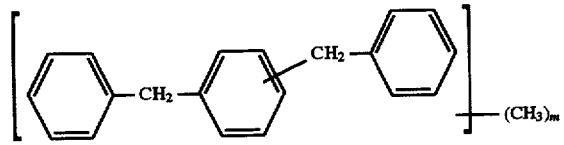

wherein m is an integer of 0 to 3.

* * * * *